United States Patent Office 3,432,306
Patented Mar. 11, 1969

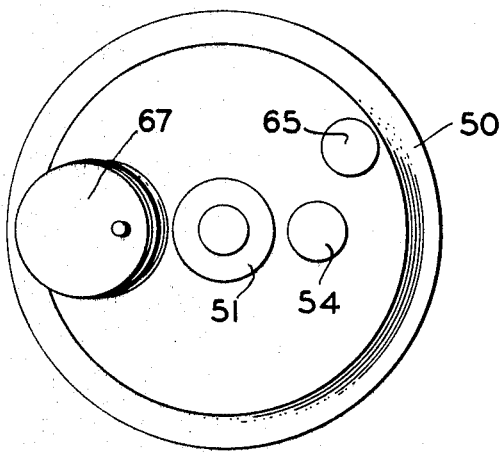
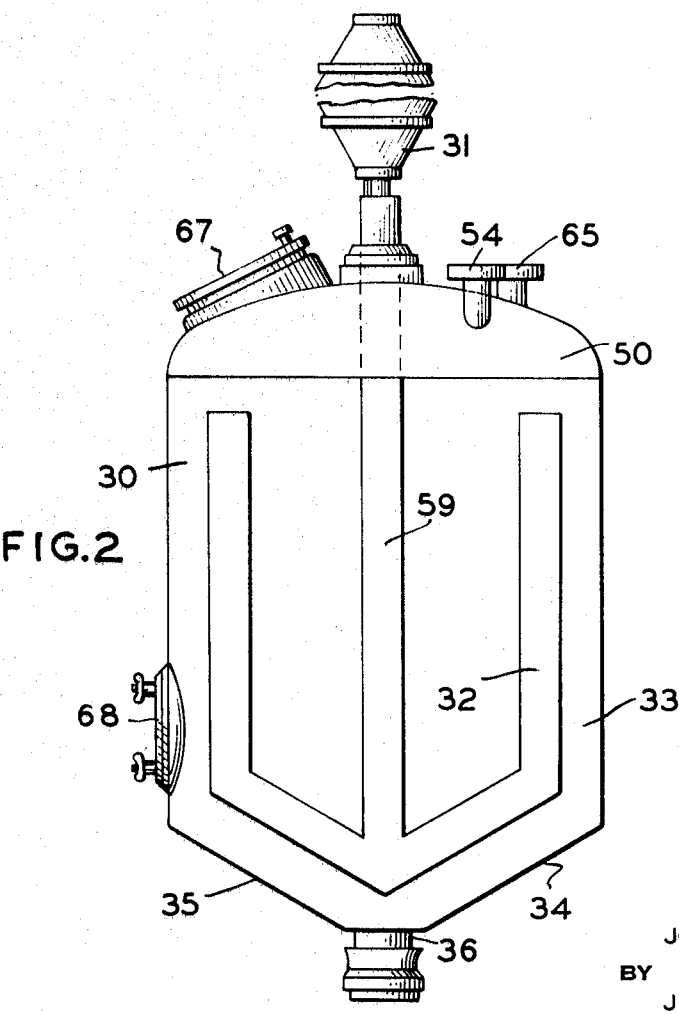

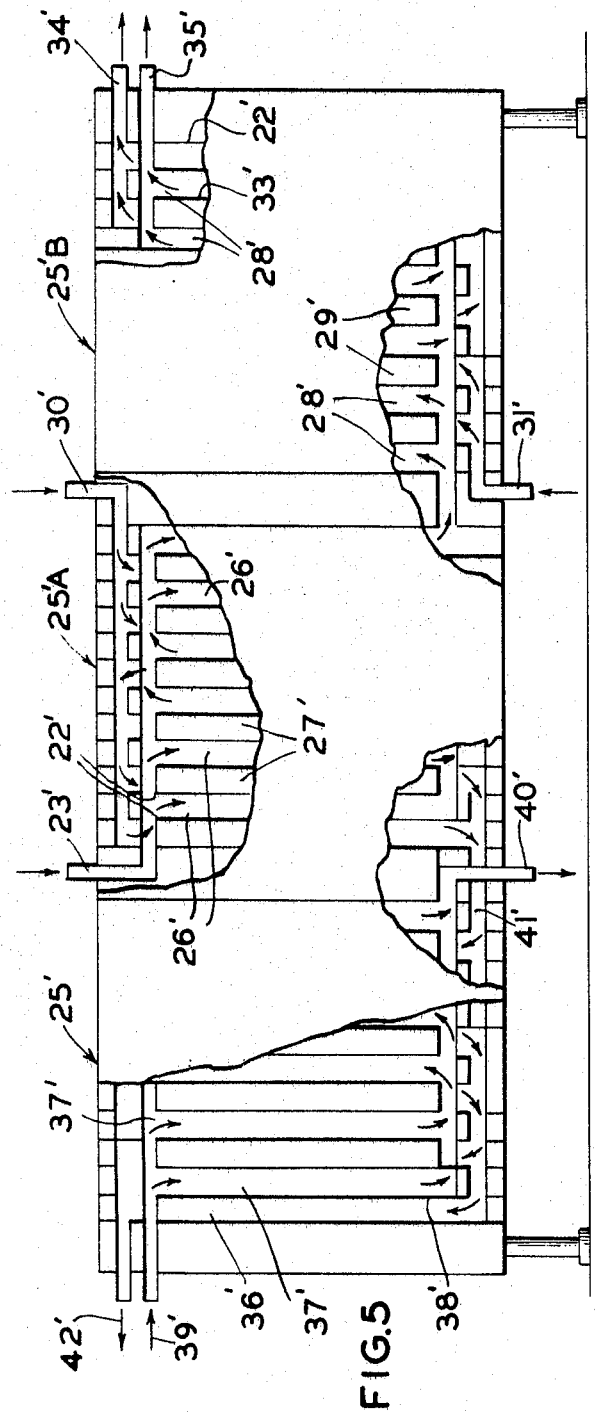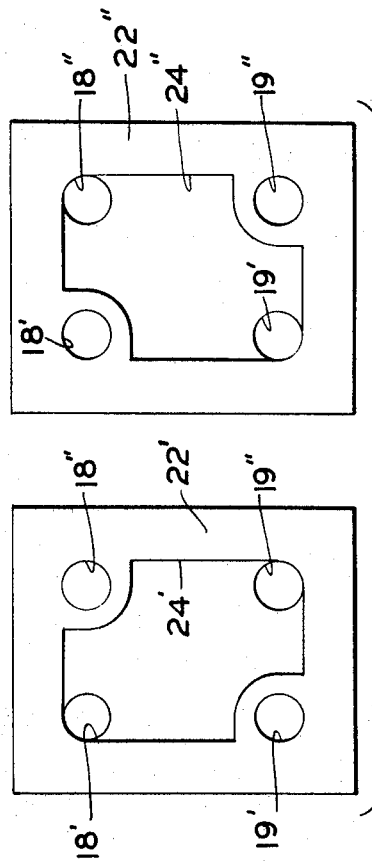

3,432,306
PROCESS OF PREPARING CHEMICALLY ACIDIFIED MILK PRODUCTS
Joseph R. Edwards, Indianapolis, Ind., assignor to Diamond Shamrock Corporation, a corporation of Delaware
Continuation-in-part of applications Ser. No. 184,517, Apr. 2, 1962, Ser. No. 194,375, May 14, 1962, and Ser. No. 279,576, May 10, 1963. This application Mar. 8, 1966, Ser. No. 532,801
U.S. Cl. 99—54                    14 Claims
Int. Cl. A23c 9/00

ABSTRACT OF THE DISCLOSURE

Milk products such as buttermilk, yoghurt and sour cream, heretofore prepared by bacterial fermentation of milk are now prepared by chemical acidification. An edible organic colloidal stabilizer such as gum tragacanth is added to milk. The milk containing the stabilizer is then heated to temperatures between about 160° F. to about 225° F. to activate the stabilizer. Then a non-toxic acid such as lactic acid or an acid liberating compound is introduced to bring about a pH of from about 3.5 to about 6 without substantially diluting the butterfat content of the milk. The resulting products are characerized by enhanced uniformity of texture and taste, freedom from separation and enhanced shelf life.

---

This application is a continuation-in-part of my co-pending applications Ser. No. 184,517, Edwards, filed Apr. 2, 1962; Ser. No. 194,375, Edwards, filed May 14, 1962 and Ser. No. 279,576, Edwards, filed May 10, 1963, all now abandoned.

This invention relates to new chemically fermented milk products normally produced by bacterial fermentation such as buttermilk, yoghurt and sour cream products such as sour cream, sour cream dressings, sour cream flavored dips and spreads, half and half dips or spreads, etc. and a process for producing them. More particularly this invention relates to sour cream, buttermilk and yoghurt products and process for producing said products in large quantities so that the products have a good consistency, appearance and flavor and retain their freshness and appearance longer than many of the known commercial fermented milk products.

By the term chemically fermented milk products, I mean milk products in which there is no appreciable separation of the milk into curd and whey, and which are produced by chemical means without the use of bacterial cultures and which have the same consistency, color, body, flavor and texture as the commercially fermented milk products such as buttermilk, yoghurt and sour cream produced through the use of a bacterial culture as the fermenting medium. The process of this invention finds particularly applicability in the preparation of such dairy products as sour cream.

In convention processes for making commercial fermented milk products such as sour cream, milk, which in the case of sour cream has a butterfat content of about 7% to 25% by weight and which may be either pasteurized or homogenized or both, is inoculated at a temperature of about 72° F. with a good culture of bacteria which produces an edible acid such as lactic acid and is allowed to stand until the milk has attained the desired acidity which in the case of sour cream is 0.5% to 1.5% by weight calculated as lactic acid. For most commercial fermented milk products it is preferred that the acidity be at least 0.7% by weight. Generally, in cases where the acidity of the milk reaches about 0.7% by weight, the milk is cooled to 40° F. to retard bacterial action and to allow the acid level of the milk to be slowly raised to a higher level. The above process suffers from the disadvantage that the incubation of the bacterial culture which is added to the milk so as to produce sufficient lactic acid usually takes from fifteen to eighteen hours or longer. This slows down the process considerably and makes it exceedingly difficult to carry out this process continuously and automatically. Another disadvantage of the prior art process of producing dairy products such as sour cream is that controlling the bacterial culture is extremely difficult and the protection of the culture from bacteriological contamination presents one of the most difficult problems in the commercial manufacture of dairy products. In cases where there is a great amount of contamination of the bacterial culture, the contamination may completely destroy the final product. Slight contamination to which bacterial cultures are almost always subject to, produce varying grades of the final product, hence making it almost impossible to obtain a uniform product from day to day. In addition, the exposure of the milk at a temperature of about 72° F. for a considerable period of time is conducive to the growth of any bacterial contaminates present in the culture.

Another disadvantage of using bacterial cultures in producing such dairy products as sour cream, yoghurt and buttermilk is that the cultures which contain live organisms often contain undesirable organisms that cause mold, off flavors, short shelf life, and poor body in the final product. Also since these cultures vary from day to day, it is imposible to obtain a final product that is consistent in body, flavor, texture, smoothness and appearance. In almost all cases the final product that is produced by the fermentation method varies depending upon the variations of the cultures. Failure of bacterial cultures to carry out the fermentation process and produce the desired acidity is also a common occurrence. This failure occurs since the fermentation reaction depends upon living organisms and any deficiency in the environment or in the necessary factors for growth may destroy the effectiveness of the bacterial culture. Another disadvantage of using the bacterial method for producing dairy products is that the milk in many cases contains antibiotics which inhibit or completely prevent the growth of the bacterial culture. A still further disadvantage inherent in the prior art processes of preparing fermented milk products such as sour cream by use of the bacterial method is that these processes require complicated equipment and elaborate handling procedures which are both time consuming and costly.

In an effort to overcome the problems in the manufacture of dairy products such as sour cream and buttermilk arising from the preparation and use of bacterial cultures, workers in the field have considered the possibility of eliminating bacterial cultures for the conversion of lactose into lactic acid by adding lactic acid directly to the milk. However, the direct addition of acid to milk to form buttermilk or sour cream has not been economically or commercially practical. One important reason is that when acid is added directly to milk a curd begins to form immediately resulting in the formation of curd and whey separation rather than a smooth, creamy, viscous, homogeneous product.

It is an object of this invention to produce chemically fermented dairy products normally produced by bacterial fermentation such as sour cream, yoghurt and buttermilk by completely chemical means without the use of bacterial cultures.

It is a further object of this invention to provide chemically fermented milk products, normally produced by bacterial fermentation, having consistently smooth, creamy, viscous body and excellent flavor and which retain their freshness and appearance for a longer period of time than many of the present commercially produced fermented milk products.

It is a further object of this invention to provide a process whereby chemically fermented milk products can be produced continuously.

It is a further object of this invention to provide a process whereby chemically fermented milk products can be produced without the need for expensive equipment or complicated handling procedures.

It is a further object of this invention to produce large quantities of sour cream quickly and easily.

Further objects of the invention will be obvious and will, in part, appear hereinafter.

I have unexpectedly found that fermented milk products normally produced by bacterial fermentation such as sour cream products, or buttermilk can be produced chemically without the use of any bacterial cultures by means of first adding an edible organic stabilizer to milk having a predetermined butterfat content, activating the stabilizer, and then adding a non-toxic acid or acid liberating compound such as an acidogen while maintaining the butterfat content of the milk at approximately the level of at least that of the milk which is used as a starting material. In this manner, a smooth, homogeneous, uniform product will be produced without danger of any curdling or appreciable separation of the milk into the curd and the whey.

My invention is predicated on the discovery that certain compounds which are classified as organic stabilizers will produce in milk products, such as in the case of cream, when an edible acid is subsequently added thereto, without decreasing or diluting the butterfat content of the cream, a thick, viscous, homogeneous, chemically fermented milk product such as sour cream without any appreciable formation of hard curd or separation of the whey.

I have found that in order to chemically ferment milk to produce the chemically fermented milk product of this invention it is essential that during the acidification of the milk, the percent butterfat content of the milk should not be substantially lowered. In this manner an acidified milk product is obtained having approximately the same butterfat content of the milk which is used as the starting material. The phenomena whereby fermentation of milk by direct acid addition takes place is believed due to the direct attack by the acid upon the solids portion of the milk so as to denature the protein within the solids portion of the milk. Since the solids portion of milk is fixed by means of the percent butterfat content of the milk, any diluting or decreasing of the butterfat content of the milk will deleteriously effect the solids portion of the milk so as not to produce a fermented milk product such as buttermilk or sour cream. I have found that lowering the butterfat content of the milk during the acidification step will not produce a chemically fermented milk product such as buttermilk or sour cream. The fermentation procedure by which the best fermented dairy product is obtained, is produced by maintaining the percent butterfat content substantially constant during the acidification process. Additional butterfat and solids may be added before or during the acidification step to increase the solids portion of the milk without deleteriously affecting the denaturation of the protein by the acid or preventing the formation of a fermented milk product such as buttermilk and sour cream. By utilizing the process of this invention, one can produce such products as sour cream, buttermilk, etc. from milk quickly and continuously, employing a variety of means, without utilizing any bacterial cultures to produce fermentation, hence avoiding the defects which are inherent in such systems. By controlling the conditions in the production of such dairy products as sour cream, such as for example, controlling the temperature of milk during processing and controlling the rate of addition of acid and stabilizer to the milk, a sour cream product can be produced having any desired uniform consistency, appearance, texture and flavor, economically and continuously.

While previously, stabilizers such as those disclosed below have been utilized in preparing fruit flavored drinks, as shown by U.S. Patent No. 2,853,386, Hughes, Sept. 23, 1958, or in fermented milk products as shown by U.S. Patent No. 2,253,614, Epstein, as thickeners (gelling agents) and substitution agents for homogenization, or in the manufacture of ice cream, their use in producing chemically fermented milk products such as sour cream and buttermilk without the use of bacterial cultures has not been known. I have discovered that through the use of these stabilizers it is possible to produce an improved fermented milk product such as sour cream which has a uniform body, a thick cream texture and good shelf stability without utilizing bacterial cultures.

Any known edible stabilizer or mixtures of stabilizers may be utilized in the process of this invention to produce an improved milk product such as buttermilk and sour cream. Typical colloidal stabilizers which may be utilized in this invention include gelatin, casein, protein, flour, tapioca flour, and other hydrophilic colloids, starch including modified starch, agar, Irish moss extract, algin, locust bean gum, guar gum, cellulose gums, such as carboxy methyl cellulose and methyl cellulose, gum tragacant, gum arabic, tapioca starch, pectin, corn starch, corn flour and mixtures thereof.

For the purpose of producing a fermented milk product such as sour cream, a milk having a high butterfat content should be utilized as a starting material. Usually the butterfat content of the milk used to prepare sour cream should be from about 7% to about 25% by weight. If buttermilk is desired, it is preferred that the skim milk that is utilized as a starting material have a butterfat content of from about 0.05% to about 3.0% by weight.

In the case of sour cream, the milk employed is homogenized milk. Homogenization can be carried out upon the milk at any time prior to acidification. Homogenization is carried out by conventional means and methods, usually at temperatures between about 130° F. to about 350° F. and usually at pressures between about 800 pounds per square inch gauge to about 3,500 pounds per square inch gauge.

A typical fermented milk product such as sour cream may be produced according to this invention in many different ways. One way in which sour cream may be prepared, according to this invention, is to add to homogenized and/or pasteurized milk containing from about 7% to about 25% by weight of butterfat, one or more of the aforementioned stabilizers at temperatures of from about 34° F. to about 80° F. The stabilized milk is then heated to a temperature range of from about 160° F. to 225° F. followed by cooling to a temperature range of from about 35° F. to about 80° F. At this latter temperature range, an edible acid such as lactic or citric acid is added to the stabilized product until the pH of the stabilized product is within the range of from about 3.5 to 6, or until the desired acidity has reached 0.5% to 1.5% by weight of the stabilized milk product calculated as lactic acid, the exact pH or desired acidity depending upon the desired final product. The flavor, texture, body, appearance and aroma of the final product may be modified, if desired, by adding commercial starter distillate (a product made by the steam distillation of a lactic acid bacterial fermentation and which contains mainly diacetyl) to the acidified product and/or a proteolytic enzyme. The product may also be carbonated to any desired level and packaged and then cooled so as to provide a cold diary product. I have found that by utilizing the process of this invention, it is possible to prepare other fermented milk products such as buttermilk or yoghurt as well as sour cream by varying the butterfat content of the starting material.

As can be seen from the above procedure, the manufacture of a fermented diary product such as sour cream or buttermilk can be performed continuously and economically without any delay, i.e., eliminating the 18 to 48 hour or more process time which is presently required because of the fermentation reaction that is encountered when bacterial cultures are added to produce sour cream. The above process of this invention can be carried out in a period of thirty minutes to one hour. Another advantage of the above process is that a uniform consistency as to body, texture, viscosity and flavor of the final product can be obtained by maintaining the process conditions at a constant level. If other milk products besides sour cream are desired, all that need be varied by utilizing the above process is the butterfat content of the starting material. I have found that buttermilk may be made by the above process, skim milk having a butterfat content of from 0.05% to about 3% by weight may be utilized. If yoghurt is desired the milk should have a butterfat content of from about 3% to about 7% by weight.

For best taste and proper health conditions in the final product of this invention, the milk used as a starting material should be of good quality and should be pasteurized or homogenized. Unpasteurized and/or unhomogenized milk may be utilized as a starting material in this invention with the same beneficial results. But in most cases, it is desirable to utilize pasteurized and homogenized milk as a starting material. Any conventional method of homogenizing or pasteurizing milk may be used to prepare the starting material to be utilized in preparing the chemically fermented milk product according to this invention. The steps of pasteurizing and homogenizing milk are old and well known and form no part of this invention.

In carrying out the process of making fermented milk products such as sour cream according to this invention, it is preferred that the stabilizer be added to milk having a butterfat content of 7% to 45% by weight, while mixing at a temperature of from about 34° F. to about 80° F. so that the stabilizer is intimately introduced either in the form of a mixture, dispersion or solution throughout the milk. If lower temperatures are utilized, the milk may start to freeze and solidify, thus making it very difficult to achieve a uniform mixture of the stabilizer within the milk. Higher temperatures than 80° F. may be utilized during the dispersing or mixing step, but it has been found that at about 80° F. it becomes harder to evenly admix, dissolve, disperse or otherwise intimately introduce the stabilizer into the milk. Hence if higher temperatures are used, higher mixing speeds and longer mixing times may be required to form a uniform dispersion or mixture. If very high temperatures are utilized, such as above 250° F., expensive equipment may have to be utilized to form a uniform dispersion or mixture.

The amount of organic stabilizer added to milk to produce all the beneficial properties inherent in the sour cream product as well as the other chemically fermented milk products of this invention should be at least 0.01% or above bsaed upon the weight of the milk. Any amount above 0.01% by weight of stabilizer may be utilized to produce the product of this invention. For best results, no more than 5% by weight of stabilizers is needed to produce the product of this invention. I have found generally that adding over 5% by weight of stabilizer based upon the weight of milk will give too thick a product which may not be desirable for general consumer purposes. The choice of the amount of stabilizer depends to a large extent upon the relative characteristics of viscosity, spreadability and the like properties desired in the finished products, which in turn is indicated by consumer preferences in various marketing areas.

After a uniform dispersion or mixture of stabilizers with the milk is obtained in the above process of making sour cream, the milk is then heated to a temperature range of from about 160° F. to about 225° F. before the addition of acid so as to activate the stabilizer and prevent protein in the milk from separating. The length of time required to activate the stabilizer at these temperatures is not critical and can vary from one second or several seconds to, e.g., one hour. After the milk is heated to the above temperature range, it may be cooled by chilling to a temperature range of about 34° F. to about 80° F. before the direct addition of an edible acid. I have found that if the acid or mixture of acids are added at this temperature range, the best texture of sour cream is obtained from a general marketing standpoint. Higher temperatures than 80° F. may be utilized during acid addition depending upon the desired final product.

For best results, enough acid or mixtures of acids should be added to the stabilized milk product, especially in the case of sour cream, so as to bring the pH of the stabilized milk product within the range of 3.5 to 6.0 and the titratable acidity to a value of from 0.5% to 1.5% by weight expressed as lactic acid. Any edible acid, acidogen, mixture of acids or acidogens or mixture of acidogens and acids may be utilized depending upon the desired flavor. The acids that may be utilized include succinic acid, maleic acid, nitric acid, acetic acid, adipic acid, hydrochloric acid, phosphoric acid, citric acid, lactic acid, etc., and mixtures thereof. Any of the acidogens such as D-glucono-delta lactone, gamma galactono lactone, tetramethyl delta mannono lactone, tertamethyl delta glucono lactone, tetramethyl delta galactono lactone, trimethyl delta arabano lactone, tetramethyl gamma glucono lactone, and trimethyl gamma arabano lactone, which yield non-toxic acids upon hydrolysis may be utilized. Typical acidogens are disclosed in U.S. Patent No. 2,982,-654, May 2, 1961, Hammond et al. The choice of a typical acid or an acidogen and the desired pH, as with the choice of stabilizers, depends to a large extent upon the relative characteristics of viscosity, spreadability, and the like properties desired in the finished product, which in turn are indicated by consumer preferences in various marketing areas. The acid or acidogen or mixtures thereof should be added in solid form where possible, or in concentrated solutions so as not to dilute or decrease the percent butterfat content of the milk and prevent the formation of the fermented milk product.

It is to be understood that the term milk as used throughout the specification and claims includes whole milk, cream, skim milk, half and half, heavy cream and milk or reconstituted milk products having a butterfat content ranging from about 0.05% to about 45% by weight and non-fat solids content ranging from about 2% to about 13% by weight depending upon the percent butterfat content of the milk. I have found that by varying or adjusting the butterfat content and solids non-fat content of the milk which is used as a starting material, the character of the resultant chemically fermented milk product may be controlled so as to produce sour cream, yoghurt, buttermilk or intermediate products thereof.

By the term without substantially lowering the butterfat content as used throughout the specification and the claims, I mean that the butterfat content of the milk that is used to prepare the chemically fermented milk product is not lowered more than 3% during the acid addition and before the subsequent formation of the chemically fermented milk product.

The following examples further illustrate the present invention; however, they are not to be construed in a limiting sense.

Example I

To 1 quart of milk having a butterfat content of 19% and a solids non-fat content of 7.16% brought to a temperature of 40° F. was added a stabilizer consisting of 6.24 grams of tapioca flour, 5.6 grams of tapioca starch, 1.13 grams of gum tragacanth and 1.13 grams of salt (NaCl) for additional flavoring. The stabilizer was added to the milk under constant stirring by means of an agitator. The temperature was then raised to 182° F. while the above additives were mixed by means of an agitator. After 30 minutes at this temperature, the stabilized milk product was quickly cooled to 72° F. After the stabilized milk product was cooled to 72° F. a mixture consisting of 4.58 ml. of 80% by weight solution of lactic acid, 2.75 ml. of 50% by weight solution of citric acid and 3.70 ml. of starter distillate were added to the stabilized milk product under constant stirring. The pH of the resultant milk product was 4.0. After mixing for one minute, a thick viscous sour cream product was produced. The produce had uniform smoothness and no off-flavors were detected. The product was packaged and then cooled to 40° F. for shipment. The cooled product had a plummet reading of 7.0.

Example II

To 1 quart of milk having a butterfat content of 18% and a solids non-fat content of 7.25% brought to a temperature of 40° F. was added a stabilizer consisting of 4.54 grams of locust bean gum, 0.57 gram of gum tragacanth, and 0.57 gram of carrageenin. The stabilizers were added to the milk under constant stirring by means of an agitator. The temperature was then raised to 180° F. while the above additives were mixed by means of an agitator. After about 30 minutes at this temperature, the stabilized milk product was quickly cooled to 65° F., a mixture consisting of 4.58 ml. of 80% by weight solution of lactic acid, 2.81 ml. of 50% by weight solution of citric acid and 3.7 ml. of starter distillate was added to the stabilided milk product under constant stirring. The pH of the resultant milk product was 3.9. After mixing for one minute, a thick viscous sour cream product was produced. The product had a uniform smoothness and no off-flavors were detected. The product was packaged and then cooled to 40° F. for shipment. The cooled product has a plummet reading of 5.5.

Example III

To 1 quart of milk having a butterfat content of about 21% and a non-fat solids content of about 6.98% at a temperature of 40° F. was added 1.13 grams of locust bean gum, a stabilizer. This stabilizer was added to the milk under constant stirring by means of an agitator. The temperature was then raised to 182° F. while the above addities were mixed by means of an agitator. After 30 minutes at this temperature, the stabilized milk product was quickly cooled to 75° F. After the stabilized milk product was cooled to 75° F. a mixture consisting of 2.21 ml. of 80% by weight solution of lactic acid, 3.33 ml. of 50% by weight solution of citric acid and 3.70 ml. of starter distillate were added to the stabilized milk product under constant stirring. The pH of the resultant milk product was 4.4. After mixing for one minute, a thick viscous sour cream product was produced. The product had uniform smoothness and no off-flavors were detected. The product was packaged and then cooled to 40° F. for shipment. The cooled product had a plummet reading of 6.5.

Example IV

To 1 quart of milk having a butterfat content of 20% and a non-fat solids content of 7.07% at a temperature of 40° F. was added a stabilizer consisting of 1.70 grams guar gum, 1.13 grams of lactose, and 1.13 grams of salt (NaCl) for additional flavoring. The stabilizers were added to the milk under constant stirring by means of an agitator. The temperature was then raised to 182° F. while the above additives were mixed by means of an agitator. After 30 minutes at this temperature, the stabilized milk product was quickly cooled to 72° F. After the stabilized milk product was cooled to 72° F., a mixture consisting of 6.65 ml. of a 50–50 mixture of 80% by weight solution of lactic acid, and 50% by weight solution of citric acid was added to the stabilized milk under constant stirring. The pH of the resultant product was 4.2. After mixing for one minute, a thick viscous sour cream product was produced. The product had uniform smoothness and no off-flavors were detected. The product was packaged and then cooled to 40° F. for shipment. The cooled product had a plummet reading of 5.5.

Example V

To 1 quart of cream having a butterfat content of 20% and a non-fat solids content of 7.07% at a temperature of 40° F. was added a stabilizer consisting of 6.24 grams of tapioca flour, 5.67 grams of tapioca starch, 1.13 grams of gum tragacanth and 1.13 grams of salt (NaCl). The temperature was then raised to 182° F. while the above additives were mixed by means of an agitator. After 30 minutes the stabilized milk product was cooled to 50° F. After cooling 2.48 grams of dehydrated onion powder and 1.28 grams of toasted chopped onions were added under constant stirring to the cooled stabilized milk product. Then, a mixture of 4.58 ml. of 80% by weight solution of lactic acid, 2.21 ml. of 50% by weight solution of citric acid, 3.70 ml. of starter distillate were added to the stabilized milk product under constant stirring. The pH of the resultant product was 4.3. After mixing for one minute, a thick viscous sour cream dip was produced. The product was packaged and then cooled to 40° F. for shipment. The cooled product had a plummet reading of 7.0.

Example VI

To 1 quart of milk having a butterfat content of 19% and a non-fat solids content of 7.16% at a temperature of 40° F. was added a stabilizer consisting of 1.70 grams of guar gum, 1.13 grams of lactose, and 1.13 grams of salt. The stabilizers were added to the milk under constant stirring by means of an agitator. The temperature was then raised to 182° F. while the above additives were mixed by means of an agitator. After 20 minutes the stabilized milk product was cooled to 72° F. After cooling, 2.89 grams of onion flavor were added under constant stirring to the cooled stabilized milk product. After 30 minutes, a mixture of 4.58 ml. of 80% by weight solution of lactic acid, 3.10 ml. of 50% by weight citric acid, 3.70 ml. of starter distillate were added to the stabilized milk product under constant stirring. The pH of the resultant product was 3.8. After mixing for one minute, a thick viscous sour cream dip was produced. The product was packaged and then cooled to 40° F. for shipment. The cooled product had a plummet reading of 7.0.

In each of Examples I through VI above, the milk employed was homogenized milk.

Example VII

This example is directed to the production of buttermilk by the process of this invention.

A mixture of 1 quart of milk and 7.0 ml. of cream (said mixture having a butterfat content of 1.5% and a non-fat solids content of 9.5%) was heated to 180° F. After the milk reached a temperature of 180° F., 2.5 grams locust bean gum and 1.0 gram of salt were added to the milk under constant stirring. After all of the locust bean gum was dispersed in the milk, the milk was cooled to 25° C. At this temperature 9.0 ml. of a 50% by volume solution of citric acid and 1.0 ml. of starter distillate were added to the stabilized milk under constant stirring. The pH of the resultant milk product was 4.7. After mixing for two minutes, a homogeneous buttermilk product was produced. The product was packaged and then cooled to 40° F. for shipment.

In all of the above examples aqueous solutions of the various acids were used.

In another embodiment, an improved method of obtaining sour cream is achieved. This embodiment comprises feeding milk as defined previously containing a predetermined butterfat content which in the case of sour cream is from about 7% to about 25% by weight of the milk and which may be homogenized and/or pasteurized into a vat, intimately introducing an organic stabilizer such as described above, into said milk, activating the stabilizer so as to stabilize said milk, passing said milk out of said vat, adding an edible acid or acidogen such as described above to said milk, while maintaining the butterfat content at approximately the same level as the milk which is used as a starting material while said milk is passing out of said vat, immediately passing said milk and acid mixture into a pressure vessel, having a bottom and top portion, said bottom portion having a surface tapered inwardly and downwardly at an angle of from about 10° to 70°, from said top portion, agitating said milk in said pressure vessel so as to bring the pH of the stabilized milk product within the range of 3.5 to 6 and passing a gas, under pressure, into said pressure vessel so as to dispense said acidified milk product into the containers in which it is sold.

Reference is now made to the accompanying drawings which illustrate a novel apparatus and a novel device which may be employed in practicing this embodiment, all to be taken merely by way of illustration and not limitation.

FIGURE 2 is a partial cross section of the front view of the pressure vessel according to this embodiment;

FIGURE 3 is a top view of the pressure vessel;

Figure 1:
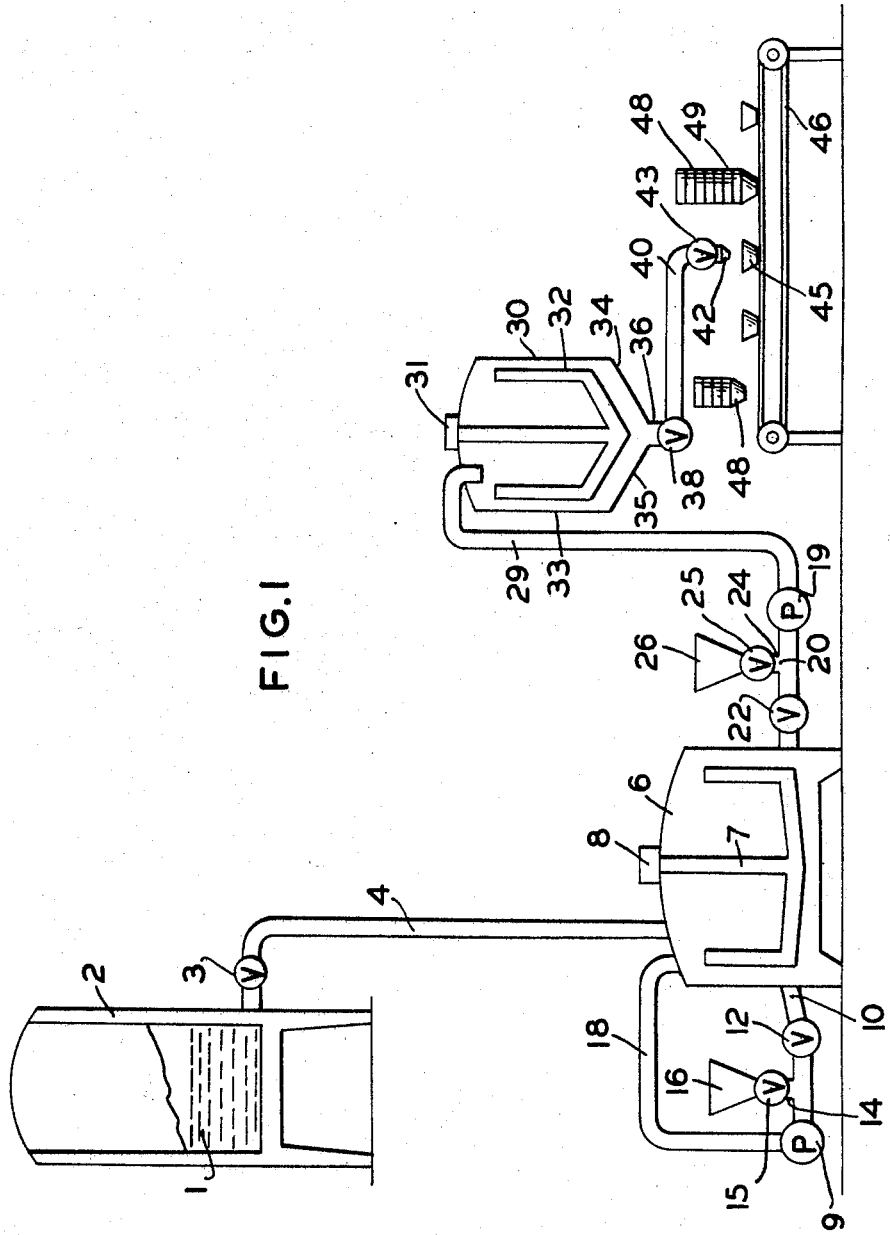
FIGURE 1 is a schematic perspective view illustrating a system for producing dairy products such as sour cream according to this embodiment.

Referring now to FIGURE 1, there is provided for producing sour cream according to this embodiment a storage tank 2 for milk 1, said storage tank 2 having an outlet valve 3 for regulating the flow of milk 1 into a vat 6. Vat 6 is equipped with an agitator 7 which, for the purposes of this invention, may be any conventional agitator such as the gate or paddle type agitator and which may be driven by motor 8 located at the top of vat 6. Vat 6 may be also equipped with a conventional type heater and cooler (not shown) for automatically heating and cooling milk 1 in vat 6. A thermostat (not shown) may also be provided in vat 6 so as to automatically regulate the heater and cooler. Vat 6 may be directly connected to the inlets of pumps 9 and 19 by means of lines 10 and 20 respectively. Line 10 carries a valve 12 for stopping or allowing fluid 1, pumped by means of the suction produced by pump 9, from flowing out of vat 6 through line 10. Feeding directly into line 10 between valve 12 and the inlet of pump 9 is an outlet line 14 which carries a funnel 16 and a valve 15 for stopping, allowing or otherwise regulating the flow of materials within funnel 16 through line 14. The outlet of pump 9 may be connected by means of line 18 to the vat 6 so as to comingle the materials of lines 10 and 14 and pump them directly into vat 6.

Line 20 which is connected to the inlet of pump 19 carries a valve 22 for stopping, allowing or otherwise regulating fluid pumped by pump 19 from flowing out of vat 6 through line 20. Feeding directly into line 20 between valve 22 and the inlet of pump 19 is an inlet line 24 which carries a funnel 26 and a valve 25 for stopping or allowing the flow of materials through line 24 from funnel 26. The outlet of pump 19 is connected directly to a pressure vessel 30 by means of line 29 so as to allow the fluids and/or materials of lines 24 and 20 to comingle and flow directly into vessel 30.

Vessel 30 may be equipped with an agitator 32 driven by a motor 31 located on top of the vessel 30. Vessel 30 contains a top portion 33 and a bottom portion 34. The bottom portion 34 may comprise a surface 35 and a horizontal outlet port 36. The surface 35 is tapered upwardly and outwardly at an angle of from about 10° to 70° from the horizontal plane which defines the outlet port 36 so that the surface 35 feeds directly into outlet port 36. Outlet port 36 may be equipped with a valve 38 so as to stop, allow or otherwise regulate the flow of the fluid out of vessel 30 and into line 40, which may be equipped with any conventional filling or regulating device so as to supply a fixed quantity of material in the form of a stream into each of the cups 45 which may be placed upon a conveyor belt 46. Any conventional filling device may be utilized to feed the sour cream or other milk products from vessel 30 into cups 45. The filling device may take the form of a nozzle 42 which is attached to line 40 and a valve 43.

If desired, the cups 45 may be automatically supplied to belt 46 by means of a dispenser 48. The cups may be then automatically filled with sour cream by means of nozzle 42 and then automatically moved by belt 46 to another station where they may be automatically sealed with caps 47 by means of a cap dispenser 49.

Referring now to FIGURE 2, vessel 30 in which the sour cream is formed from milk and dispensed, may comprise a top casing 50, a top portion 33 and a bottom portion 34. The bottom portion 34 consists of an outlet port 36 and a surface 35. The top casing 50 may be placed on the top portion 33 so as to form an airtight seal. The top portion 33 of vessel 30 may be square, rectangular, circular, elliptical or any other convenient shape. The bottom portion 34 of the vessel 30 may be conical or may consist of two walls or may be circular, rectangular or any other shape so long as it forms a surface 35 which is tapered upwardly and outwardly from the outlet port 36 at an angle of between about 10° to 70°.

The vessel 30 may be equipped with an agitator 32 which may be any conventional agitator and may be driven by means of motor 31 located outside and on top of the vessel 30. The vessel 30 may be sealed off from the atmosphere by means of top casing 50 having hole 51 (as seen in FIGURE 3) which provides means for inserting shaft 59 of agitator 32 into the vessel 30. The top casing 50 is also fitted with an inlet port 54 through which the materials from line 29 (see FIGURE 1) may be fed directly into the vessel 30. If it is desired to operate vessel 30 automatically, the vessel 30 may be equipped with a suitable valve (not shown) such as any conventional float valve which may be attached directly to line 29 through inlet port 54 so as to stop, allow or otherwise regulate the flow of fluid through inlet port 54 into vessel 30. A pressure elevating means which for purposes of illustration is shown as a gas inlet tube 65 may be provided to maintain suitable superatmospheric pressure within vessel 30. A pressure gauge (not shown) may be supplied to the vessel so as to regulate and automatically control the pressure within vessel 30. Suitable glass windows 67 and 68 may be supplied in the walls of the vessel 30 to allow an operator to watch the operation.

To perform the method of this invention, milk 1 which may be either homogenized, pasteurized or both, having a butterfat content of from 7% to 25% by weight, may be supplied from storage tank 2 to vat 6 by means of line 4, while valves 12, 15, 22 and 25 are closed. Milk having a lower butterfat content than from 7% to 25% may be utilized in tank 2 and the butterfat content may be raised by adding cream or any other high butterfat containing substance to the milk at any point in the process before the milk is acidified so as to raise the butterfat content to the desired predetermined range. It is of course understood that in the preparation of sour cream, the milk is homogenized at some time prior to the acidification step.

After the milk 1 is fed into vat 6, the milk 1 may be then heated to a temperature of from about 34° F. to 80° F. while being agitated by means of agitator 7 so as to bring the milk to the aforementioned desired temperature quickly. If desired, agitation need not be used at this stage. While the milk is reaching the desired aforementioned temperature which is needed to dissolve, disperse or otherwise intimately introduce the stabilizer which is subsequently added, a stabilizer such as hereinbefore disclosed may be supplied to the funnel 16 (by means not shown) in amount of 0.01% to 5% based upon the total weight of the milk supplied to the vat 6. As soon as the temperature of the milk reaches a temperature of from about 34° to 80° F., pump 9 may be started up and valves 12 and 15 may be opened to allow the milk 1 to be recycled into and out of vat 6 by means of lines 10 and 18. During this recycling period, the stabilizer which is placed in funnel 16 may be added to the milk in line 10 from line 14. After all of the stabilizer is added, valves 12 and 15 may then be closed stopping the milk 1 from flowing out of vat 6. When all of the milk 1 is in vat 6, pump 9 is then stopped.

The milk containing the stabilizer is next heated under constant agitation in vat 6 to a temperature of from 160° to 225° F. By utilizing this heating step the stabilizer can later function, when acid is introduced, to prevent the milk from curdling and to allow the chemical fermenting process of the milk to proceed. The heat may be then turned off and the agitation stopped after at least 10 minutes at this temperature. The milk may be then cooled either by standing or by means of a cooler in vat 6 to a temperature of from 35° F. and 80° F. During this cooling step, agitation may be continued.

If desired the milk 1 may be homogenized and pasteurized during the process. In carrying out this procedure, the stabilizer may be directly intimately introduced into the milk 1 during the steps of homogenization and pasteurization without the need of utilizing vat 6. The stabilizers may be added to the milk while the milk 1 is stored in tank 2. The stabilizer and milk 1 may be fed directly into a homogenizer and a pasteurizer where the stabilizer may be intimately introduced into the milk and the milk heated to between 160° F. and 225° F. to activate the stabilizer and to stabilize the milk. Any conventional homogenizer and pasteurizer may be utilized. During the final stage of homogenization and pasteurization the milk is cooled in the pasteurizer and homogenizer so that it leaves this apparatus at a temperature of from 35° F. to 80° F. In this condition the stabilized milk is ready for the acidification step. By utilizing this method of pasteurization and homogenization, I can produce a chemically fermented milk product such as sour cream while simultaneously homogenizing and pasteurizing this product. In this manner a pasteurized and homogenized fermented milk product is produced from raw milk quickly and easily without the need for bacteria cultures or lengthy pasteurization or homogenization procedures. Also by utilizing this procedure an even, uniform fermented milk product is produced quickly and inexpensively.

The acidification of the stabilized milk is performed by introducing into the stabilized milk a sufficient amount of acid to raise the pH of the milk to a pH of from about 3.5 to 6. The stabilized milk 1 may be pumped out of vat 6 by means of activating pump 19 and opening valve 22. Valve 25 may be opened so as to supply acid from funnel 26 either continually, drop by drop or in fixed given amount into line 20. In line 20 the acid supplied from funnel 26 mixes with the milk 1 coming from vat 6. Pump 19 then pumps milk 1 and the acid directly through pipe 29 into pressure vessel 30. As soon as all of the stabilized milk is acidified and pumped into vessel 30, pump 19 may be stopped and valve 22 may be closed and a new supply of milk 1 may be added to vat 6 from tank 2 and treated in the same manner.

The above process may be performed automatically and continuously by regulating the heating and cooling, the opening and closing of valves 12, 15, 22 and 25 and the stopping and starting of pumps 9 and 19 by means of a thermostat (not shown) which may be located in vessel 6. Tank 2 may alternatively supply a number of vats, such as vat 6, so that while the milk 1 is being processed in one vat 6, another vat 6 is being supplied with milk 1 from storage tank 2.

When the stabilized milk and acid are fed into pressure vessel 30, (the valve 38 being closed) agitator 32 may be started so as to thoroughly mix the acid and the stabilized milk producing the chemically fermented sour cream product of this invention.

During this stage of the process, the portion of sour cream which is at the bottom of said pressure vessel is positioned from about 10° to 70° above the horizontal plane which defines the outlet port 36 of the vessel 30. This occurs since the surface 35 which is attached to the outlet port 36 is tapered so that it slopes upwardly and outwardly from the plane of outlet port 36 at an angle of from about 10° to 70°.

After the stabilized milk and acid have been agitated in vessel 30 for a period of time sufficient to thoroughly mix the acid into the milk and allow this product to thicken and become viscous, the pressure within vessel 30 may be raised to at least 1 lb./in.$^2$ gauge by any conventional means such as by feeding a gas such as air into the vessel 30 through the gas inlet pipe 65 while simultaneously opening valve 38. The combination of the pressure and the metastable positioning of the bottom portion of the sour cream due to the aforementioned sloping of surface 35 cause the thick viscous creamy product which is formed in vessel 30 to flow through the outlet port 36 of vessel 30 into a conventional filling device such as line 40 so that the sour cream may be automatically supplied to cups 45.

If it is desired, a pressure of at least one pound per square inch gauge may be continually maintained in vessel 30 so that the sour cream may be continually supplied without interruption to cups 45. Fresh mixtures of acid and stabilized milk may be continually supplied to vessel 30 by means of line 29 and continually discharged from vessel 30 through outlet port 36 by means of the metastable positioning of the sour cream at the bottom of the vessel and the superatmospheric pressure within vessel 30. A float valve (not shown) positioned near inlet 54 in conjunction with valve 36 may be utilized to regulate the level of the milk and acid mixture within the vessel so as to always maintain a constant level of milk and acid mixture within the vessel 30. As a result, the milk and acid mixture which enters the top vessel 30 will be vigorously stirred by means of agitator 32. As it moves slowly down the vessel 30 by means of the constant ejection of sour cream at the bottom of the vessel 30, the acid and milk are mixed so that the acidified milk thickens and increases in viscosity until it becomes sour cream. By the time this milk and acid mixture reaches the bottom portion of vessel 30 where it contacts the bottom portion 35 of vessel 30, its conversion into sour cream is complete, and it is ready for packaging and shipping. In this manner, sour cream may be produced continuously in vessel 30 from stabilized acidified milk and handled with a minimum amount of difficulty and waste. By use of the above apparatus and continuous procedure for producing sour cream from a stabilized milk and acid mixture, acidified stabilized milk products may be supplied from different systems to the vessel 30. In this manner acidified, stabilized milk may be continually supplied to vessel 30 for continuous conversion in a matter of a few seconds by means of chemical fermentation to sour cream.

I have found that by utilizing the above procedure, other dairy products may be prepared such as buttermilk or yoghurt. All that need be varied in the above procedure is the butterfat content of the starting material. If it is desired to make butermilk by the above process, milk having a butterfat content of from about 0.5% to 3.0% by weight may be utilized. If yoghurt is desired then milk having a butterfat content of from about 3% to about 7% by weight should be utilized.

As seen from FIGURES 1 and 2 it is essential that the surface 35 of the bottom portion 33 of the pressure vessel 30 slope upwardly and outwardly at an angle of from about 10° to 70° from the horizontal plane which defines the outlet port 36 so that the sour cream produced in vessel 30 which contacts surface 35 is positioned at an angle of from about 10° to 70° from the plane defined by the outlet port. I have found that by placing sour cream at this angle, the sour cream is placed in a metastable position so that it has the greatest tendency for motion. In this manner, the sour cream may be easily discharged from vessel 30 by means of applying a pressure of at least one pound per square inch gauge. If this pressure is utilized upon a non-sloped surface such as any ordinary vessel, the sour cream will discharge very slowly, if at all, from this vessel. This is true, since sour cream is a thick viscous, non-flowable product which has a tendency to remain stationary and rest upon the walls of the container or vessel in which it is stored or packaged.

If the surface 35 is tapered at an angle of greater than 70°, the sour cream will show little tendency for motion since at these angles sour cream tends to rest very securely against the walls of the vessel or container in which it is stirred.

It is also essential that a pressure of at least one pound per square inch gauge be utilized in conjunction with the metastable positioning of the sour cream in order to move the sour cream out of the vessel 30. Preferably, pressures of from 1 pound per square inch gauge to 5 lbs. per square inch gauge may be utilized. Pressures of greater than 5 pounds per square inch gauge may be utilized. Since no additional beneficial results are obtained by utilizing pressures higher than 5 pounds per square inch gauge and higher equipment costs are encountered by using high pressures, pressures of greater than 5 pounds per square inch gauge are seldom utilized.

The following two examples illustrate this embodiment; however they are not to be construed in a limiting sense.

Example VIII 200 gallons of pasteurized and homogenized milk having a butterfat content of 19% by weight was pumped into the 300 gallon vessel which is illustrated as 6 in FIGURE 1, said vessel being equipped with an agitator and a recycle system. A stabilizer mixture constituting 11 lbs. of tapioca flour, 10 lbs. of tapioca starch, 2 lbs. of gum tragacanth, and 2 lbs. of salt (NaCl) was fed into the recycle while the milk was being recycled. The dry stabilizer mixture was completely sucked into the milk through the funnel in the recycle system in approximately one to two minutes. After this time the valve of the recycle was closed and the pump was turned off. The contents of the vat were heated to 182° F. in about 43 minutes by means of steam. The contents of the vat were held at this temperature for approximately 30 minutes, after which time the contents were cooled to 72° F. utilizing well water. After the contents of the vessel reached this temperature, the bottom valve of the vat which was connected with a 1½ inch pipe to a gravity funnel and then to a positive rotary pump was opened. A liquid mixture constituting 125 fluid ounces of 80% by weight of lactic acid in a water solution, 75 fluid ounces of 50% by weight citric acid in a water solution and 100 fluid ounces of starter distillate were placed in this funnel. The positive pump was turned on and the valve of the vat opened. The acid was added to the milk by means of the funnel in approximately 120 seconds. The acidified product was then pumped by means of the positive pump into vessel 30 shown in FIGURE 1. This vessel had a conical bottom, sloped at an angle of approximately 20° from the horizontal and was equipped with an agitator. When all of the milk was added to the vessel, the agitator was turned on. After approximately 3 minutes the agitation was stopped and it was observed that the liquid within the vessel thickened to produce thick viscous sour cream. The sour cream was dispensed from the vessel by means of creating a pressure within the vessel of approximately 2 lb. per square inch gauge. The sour cream was removed from the vessel through a nozzle and placed in small containers and then sealed and cooled to 40° F.

EXAMPLE IX 200 gallons of pasteurized and homogenized milk having a butterfat content of 19% by weight was pumped into the 300 gallon vessel which is illustrated as 6 in FIGURE 1, said vessel being equipped with an agitator and a recycle system. A stabilizer mixture constituting 12 lbs. of tapioca flour, 13 lbs. of tapioca starch, 2 lbs. of gum tragacanth, and 2 lbs. of salt (NaCl) was fed into the pipe of the recycle while the milk was being recycled to the vessel. The dry stabilizer mixture was completely sucked into the milk through the funnel in the recycle in approximately one to two minutes. After this time, the valve of the recycle was closed and the pump was turned off. The contents of the vat were heated to 182° F. in about 43 minutes by means of steam. The contents of the vat were held at this temperature for approximately 20 minutes, after which time the contents were cooled to 72° F. utilizing well water. After the contents of the vessel reached this temperature, the bottom valve of the vat which was connected with a 1½ inch pipe to a gravity funnel and then to a positive rotary pump, was opened. A liquid mixture constituting 150 fluid ounces of 80% by weight lactic acid in a water solution, 60 fluid ounces of 50% by weight citric acid in a water solution and 100 fluid ounces of starter distillate were placed in this funnel. The positive pump was turned on and the valve of the vat opened. The acid was added to the milk by means of the funnel in approximately 100 seconds. The acidified product was then pumped by means of the positive pump vessel 30 shown in FIGURE 1. This vessel had a conical bottom that sloped approximately 20° from the horizontal and was equipped with an agitator. When all of the milk was added to the vessel, the agitator was turned on. After approximately 2 minutes, the agitation was stopped and it was observed that the liquid within the vessel thickened to produce a thick viscous sour cream. The sour cream was dispensed from the vessel by means of creating within the vessel approximately 2 lbs. per square inch gauge pressure. The sour cream was removed from the vessel through a nozzle and placed into small containers, then sealed and cooled to 40° F.

In another embodiment, I have unexpectedly discovered that milk as defined previously and having a butterfat content of from about 0.05% to about 45% can be pasteurized, homogenized and chemically fermented in one process to produce homogenized and pasteurized chemically fermented milk products such as sour cream, buttermilk, etc. by means of first adding an edible organic stabilizer to raw milk having a predetermined butterfat content, next heating the milk to a temperature of from about 160° F. to about 350° F. to simultaneously pasteurize the milk and activate the stabilizer, next passing the milk at this temperature through a homogenizer so as to homogenize said milk, cooling the milk to a temperature of from about 35° to 80° F. and finally adding an edible acid or an acid liberating compound such as an acidogen in an amount sufficient to produce a pH of approximately from about 3.5 to 6 in the milk, while maintaining the butterfat content at approximately the level of at least that of the milk which is used as a starting material. In this manner, a smooth, uniform and homogeneous pasteurized product will be produced without the need for any separate step of homogenization and pasteurization. Hence, by utilizing this embodiment, dairy products such as sour cream, buttermilk, yoghurt can be continuously pasteurized, homogenized and continuously produced from raw milk in a time of approximately five minutes.

Reference is now made to certain of the accompanying drawings which illustrate a novel apparatus and a novel device which may be employed in practicing this embodiment, all to be taken merely by way of illustration and not limitation.

Figure 4:
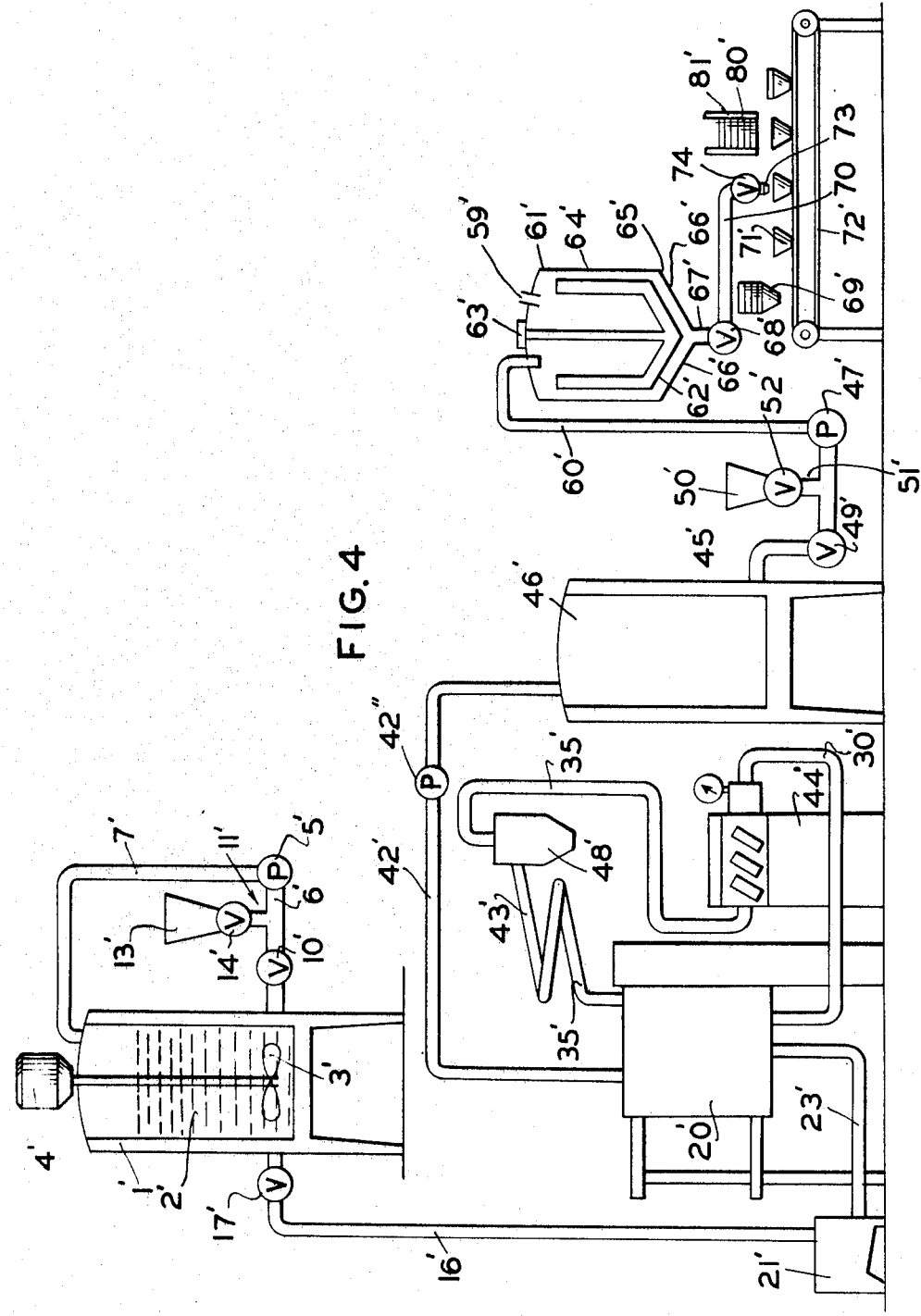

FIGURE 4 is a schematic perspective view illustrating the system for producing dairy products such as sour cream according to this embodiment;

FIGURE 5 is a schematic perspective view of a cross section of the high temperature short time pasteurizer utilized in this embodiment;

FIGURE 6 is a perspective front view of two plates 22' and 22" used in the pasteurizer 20' of this invention.

Referring now to FIGURE 4, the preferred system for producing sour cream and other chemically fermented milk products according to this embodiment comprises a storage tank 1' for milk 2', said storage tank 1' being equipped with an agitator 3' which may be any conventional agitator such as a gate or paddle type agitator. The agitator 3' may be driven by a motor 4' which can be located at the top of tank 1'. The inlet of a suitable pump 5' may be directly connected to tank 1' by means of line 6' so as to cause the milk 2' to flow out of tank 1' through line 6'. A valve 10' may be placed in line 6' next to tank 1' for stopping or allowing or otherwise regulating the flow of milk 2' out of tank 1' and into line 6'. A line 7' which feeds directly into tank 1' can be connected to the outlet of pump 5' so as to permit the milk 2' flowing out in line 6' to feed directly back into tank 1'. Feeding directly into line 6' between valve 10' and the inlet of pump 5' is a line 11'. A funnel 13' may be directly connected to line 11' so that material which in this case is the stabilizer or mixtures thereof, may be fed into line 11' from funnel 13'. Funnel 13' carries a valve 14' for stopping or allowing or otherwise regulating the flow of material from funnel 13' into line 11' and consequently into line 6'.

The outlet line 16' is connected to tank 1' so as to allow the mixture of the milk 2' and the material supplied from funnel 13' to flow out of tank 1' through line 16'. Line 16' carries a valve 17' next to tank 1', which stops, allows or otherwise regulates the flow of the mixture out of tank 1' and into line 16'. Line 16' may be equipped with a pump (not shown) for pumping the mixture out of tank 1' and into line 16'. Alternatively the flow of mixture out of tank 1' and through line 16' may be provided by gravity, as shown. Line 16' may be directly connected to a conventional pasteurizer 20' or as shown in FIGURE 4, a metering device such as a balance tank 21' may be provided to regulate the rate of the flow of milk from line 16' into the pasteurizer 20'. In the latter case, a line 23' is provided to allow the milk to flow from the balance tank 21' into a pasteurizer 20'.

FIGURE 5 shows a preferred type of pasteurizer 20' which may be utilized in this invention. The preferred pasteurizer 20' which may be utilized in this invention may be divided into three sections 25', 25'A and 25'B. These sections are the cooling section 25', the regeneration section 25'A and the heating section 25'B. All of these sections contain a plurality of vertically disposed solid plates 22'. The separation between these vertically disposed plates 22' form zones through which the material to be cooled is passed (cooling zones) and zones through which the material to be heated is passed (heating zones). In FIGURE 5, the plates illustrated are partially cut away so as to trace the flow of the materials through the different zones. The manner of flow of these materials into the zones defined by the plates 22' is described in connection with FIGURE 6.

The regeneration section 25'A of the pasteurizer 20' includes a series of interconnected heating zones 26', defined by a plurality of solid plates 22' through which the milk from line 23' is passed, and a series of interconnected cooling zones 27', defined by the plurality of solid plates 22', through which the heated milk that comes from the homogenizer 44' is passed. Line 23' is directly connected to the first two zones in the series of heating zones 26' within the regeneration section 25'A so that the raw milk coming into the pasteurizer flows from line 23' through the series of heating zones 26' concurrent to the flow of warm homogenized milk in the cooling zones 27'. While the flow of the milk to be cooled and the flow of the milk to be heated is illustrated in section 25'A as concurrent, countercurrent flow can be used to obtain the same beneficial heating and cooling results. The plates 22' are so arranged in the regeneration section 25'A so that the heating and cooling zones share a common surface wall. The warm homogenized milk coming into the regeneration section 25'A from the homogenizer 44' passes into the series of cooling zones 27', by means of line 30' which is directly connected to the last two zones in the series of cooling zones 27'. Line 30' may contain a pump (not shown) so as to allow the milk coming out of the homogenizer 44' to flow into the pasteurizer 20'.

The heating section 25'B contains a series of connecting heating zones 28', defined by a plurality of solid plates 22' through which the milk coming from the last heating zone of the series of heating zones 26', contained within the regeneration section 25'A, is passed and a series of connected cooling zones 29' through which a heating medium such as hot water, steam or superheated steam is passed. The hot water enters the heating section 25'B through line 31' which is directly connected to the first two zones in the series of cooling zones 29', and is expelled from the last zone in this series of cooling zones 29' by means of an exhaust line 34' which is connected to the last zone in this series of cooling zones 29'. Line 35' is directly connected to the last heating zone in the series of heating zones 28' in order to carry the heated milk into the homogenizer 44'. The flow of milk to be heated in zones 28' and the hot water in zones 29' in the heating section is shown for purposes of illustration as concurrent. It is apparent that the flow of liquids in this section can be countercurrent as well as concurrent. The heating and cooling zones are so arranged in the heating section that each cooling and heating zone shares a common surface wall 33' of plates 22' which are vertically disposed in the heating section 25'B.

The cooling section 25' of the pasteurizer consists of a series of connecting cooling zones 36', defined by a plurality of solid plates 22', through which the homogenized, cooled milk from the regeneration section 25'A is passed and a series of connecting heating zones 37', defined by a plurality of solid plates, through which cold tap water is passed. The heating and cooling zones are so arranged in the cooling section 25', that each cooling and heating zone shares a common surface wall 38'. A pipe 39' is connected to the first zone in the series of heating zones to supply the cold water to the series of heating zones 37', and a pipe 40' is connected to the last zone in the section of heating zones 37' so as to remove the cold water from the cooling section 25'. The flow of milk to be cooled in zone 36' and the cold water in zone 37' in section 25' is shown for purposes of illustration as countercurrent. It is apparent that the flow of liquids in section 25' can be concurrent as well as countercurrent. The milk from the series of cooling zones 27', in the regeneration section 25'A is carried into the cooling section 25' by means of pipe 41', which is connected to the first zone in the series of cooling zones 36'. The cooled milk leaves the last cooling zone by means of line 42' which is connected to the last zone in the series of cooling zones 36'. In this manner the cooled homogenized and pasteurized milk is removed from the pasteurizer 20'.

FIGURE 6 shows a side view of the typical plates 22' and 22" in the series of vertically disposed plates 22' within the pasteurizer 20' so as to illustrate the flow of materials into and out of the various zones formed by these vertically disposed plates 22'. Each plate 22' and 22" contains two inlet holes 18' and 18" and two outlet holes 19' and 19" through which the material in pasteurizer 20' flows. Each plate 22' and 22" contains a solid gasket 24'. On plate 22' the gasket 24' is disposed under holes 18" and 19' so as to seal off holes 18" and 19' from the rest of the plate 22'. Hence material which is flowing through holes 18" and 19' can not enter onto plate 22' so as to flow through the zone defined by plate 22' and its next adjacent plate 22" due to the barrier imposed by means of gasket 24'. Gasket 24' on plate 22' is disposed above holes 18' and 19" so as to allow material flowing through holes 18' and 19" free access to plate 22'. Hence the material that is flowing through hole 18' can enter onto plate 22' to flow through the zone defined by plate 22' and its next adjacent plate 22". The material flowing onto plate 22' from hole 18' will leave plate 22' through hole 19".

Plate 22" is the next adjacent vertically disposed plate to plate 22'. On plate 22" the gasket 24" is disposed under holes 18' and 19" so as to seal off the holes 18' and 19" from the rest of the plate. In this manner the material that flows down plate 22' into hole 19" cannot enter onto plate 22" since hole 19" is sealed off from plate 22". Hence the material which is flowing through hole 19" will flow onto the next adjacent plate (not shown) to plate 22". The material which is flowing through hole 18" which could not flow onto plate 22' since hole 18" was sealed off from plate 22" by gasket 24' can flow into plate 22" since gasket 24" does not seal it off from plate 22". The material that is flowing through hole 18" flows out onto plate 22" and leaves plate 22" by means of hole 19'. In this manner the material such as milk or water, is passed through the different zones defined by the vertically disposed plates 22' in pasteurizer 20'.

Referring now to FIGURE 4, outlet line 35' is connected to the inlet of homogenizer 44' which may be any conventional homogenizer, and to the outlet of the pasteurizer 20' so as to carry the heated milk from the pasteurizer 20' into the homogenizer 44'. Outlet line 35' may be equipped with a pump (not shown) for carrying the milk out of the pasteurizer 20' into homogenizer 44'. Outlet line 35' is equipped with coiled holding tubes 43', i.e., heating coils, to hold the milk and stabilizer at the pasteurization temperature for a period sufficient to destroy all the toxic bacteria within the milk before it enters the homogenizer 44'. This holding period is generally from 10 to 36 seconds or longer depending upon the temperature of the milk and stabilizer mixture. Seldom is it necessary to utilize periods longer than 36 seconds. Alternatively, the holding tubes 43' may be located in line 30' and the milk may be held in the coiled tubes at a temperature of from 140° F. to 350° F. for a period sufficient to destroy the toxic bacteria after it leaves the homogenizer 44' and before it re-enters the regeneration section 25'A of the pasteurizer 20'. Line 35' may be also equipped with a flow diversion valve 48' for regulating the flow of the heated milk into the homogenizer 44'. The outlet of homogenizer 44' is connected to the regeneration section 25'A of pasteurizer 20' by means of line 30', which may be equipped with a pump (not shown) so that the heated homogenized milk can flow into the pasteurizer 20' where it is cooled. Outlet line 42' of the cooling section of pasteurizer 20' carries the cooled stabilizer and milk mixture from the cooling portion 25' of the pasteurizer 20' into the tank 46'. Outlet line 42' may be equipped with a pump 42" to carry the milk mixture into tank 46'. Tank 46' contains an outlet line 45" which may be equipped with a pump 47' so as to allow milk and stabilizer to flow out of storage tank 46' and into line 45'. Line 45' may be equipped with a valve 49' which stops, allows or otherwise regulates the flow of fluid, pumped by pump 47', out of tank 46' and into line 45'. Feeding directly into line 45' between valve 49' and the inlet of pump 47' is an inlet line 51' which carries a funnel 50' and a valve 52' for stopping, allowing or otherwise regulating the flow of materials which in this case are acids, from the funnel 50' through line 51' and into line 45'. The outlet of pump 47' is connected directly to a vessel by means of line 60' wherein the acidified milk is allowed to reach the desired pH so as to form a product conforming to a fermented milk product such as sour cream, buttermilk, etc.

In a preferred embodiment, vessel 61' may be equipped with a gas inlet port 59', an agitator 62' driven by a motor 63' which is located on the top of vessel 61'.

Vessel 61' contains a top portion 64' and a bottom portion 65'. The bottom portion 65' may comprise a surface 66' and a horizontal outlet port 67' which is connected to an outlet line 70'. The surface 66' is tapered upwardly and outwardly at an angle of from 10° to 70° from the horizontal plane which defines outlet port 67' so that surface 66' feeds directly into outlet port 67'. Outlet port 67' may be equipped with a valve 68' so as to stop or otherwise regulate the flow of fluid out of vessel 61', and into line 70' which may be equipped with any filling or regulating device so as to supply a sufficient quantity of material in the form of a stream into each of the cups 71' which may be placed on a conveyor belt 72' by means of a dispenser 69'. Any conventional filling device may be utilized to feed the sour cream or other chemically fermented milk products from vessel 61' into the cups 71'. The filling device may take the form of nozzle 73' which is attached to line 70' and a valve 74' for regulating the flow of the product through nozzle 73' and into the cups 71'.

If desired the cups 71' may be automatically supplied to belt 72' by means of a dispenser 69'. The cups may then be automatically filled with the sour cream or any other chemically fermented milk product by means of nozzle 73' and then automatically moved by the belt 72' to another station where they may be automatically sealed with caps 80' by means means of a cap dispenser 81'.

The milk from line 60' may be fed into any tank where it may be stored and allowed to reach the desired acidity. However, pressure vessel 61' is a preferred kind of tank that may be used to thicken and acidify the milk to form the chemically fermented milk product and dispense the milk into cups to be sold to the consumer.

To practice this embodiment, milk 2' having a butterfat content of from 0.5% to about 45% by weight may be supplied to a storage tank 1'. To the milk that is present in the storage tank, a stabilizer is added. The stabilizer, such as hereinbefore disclosed, is supplied to the milk by means of a funnel 13' in an amount of from 0.01% to 5% based upon the total weight of the milk in tank 1'. The stabilizer is supplied to the milk by starting pump 5' and opening up valve 10' so that the milk can flow from storage tank 1' into line 6' where it receives the stabilizer. Simultaneously, valve 14' is opened so that the stabilizer flows from funnel 13' into line 11' and into line 6' where it comingles with the milk 2'. The milk 2' and the stabilizer are pumped by means of pump 5' from line 6' into line 7' and back in tank 1' where the stabilizer and milk are thoroughly mixed. The stabilizer and the milk mixture is constantly agitated in tank 1' by means of an agitator 3' which is driven by motor 4'. Milk may be continuously supplied to storage tank 1', and may be continuously pumped from storage tank 1' into line 10' while the stabilizer is constantly supplied by means of funnel 13' into line 6' and continuously recycled back into the storage tank 1' as a mixture of stabilizer and milk through line 7'. As stabilizer is supplied from funnel 13' to the milk 1', the stabilized milk mixture is constantly removed from storage tank 1' by means of opening valve 17' so that the mixture may flow into line 16'. In this manner a continuous method of adding stabilizer to milk so that the milk may be subsequently converted to a fermented product such as sour cream, buttermilk, yoghurt, etc. is provided.

The stabilizer in the milk is activated so that when acid is subsequently added, the milk will thicken and not separate into the curd and whey. This is accomplished by heating the milk containing the stabilizer to a temperature of from 160° F. to 350° F. prior to the addition of the acid. This heating is accomplished during the step of pasteurization when the milk is heated to a temperature sufficient to kill the toxic bacteria within the milk. Hence, after the stabilizer is added to and mixed with the milk in tank 1', the stabilized milk mixture flows from storage tank 1' through line 16' and into the pasteurizer 20'. Generally it is preferred to utilize a flow meter to regulate the flow of the milk 2' containing the stabilizer into the pasteurizer 20'. This is accomplished by allowing the milk in line 16' to flow into balance tank 21' which regulates the flow of milk into line 23' which is connected directly to the regeneration section of pasteurizer 20'. Pasteurization is achieved in pasteurizer 20' by heating the milk, stabilizer mixture to a temperature of from 160° F. to 350° F. This temperature kills the toxic bacteria in the milk as well as activates the stabilizer so that when acid is subsequently added thereto the milk will thicken and not separate into the curd and whey.

FIGURE 5 illustrates one type of pasteurizer which can be utilized in this invention. This is but one of the many types of pasteurizers which can be utilized in carrying out this embodiment since any conventional pasteurizer may be utilized in accordance with this invention. The milk from line 23' passes into the regeneration section 25'A of pasteurizer 20' through the first two alternative heating zones 26' in the series of heating zones 26' in the regeneration section 25'A. The milk is shown as flowing through the pasteurizer in two alternative heating zones which form one pass. In this manner complete concurrent flow is achieved since the milk to be cooled also flows into two alternative cooling zones 27'. Hence the milk to be cooled flows in an opposite direction to the flow of the milk to be heated in both of the adjacent zones to the zone containing the milk that is to be cooled. If desired, the milk to be heated may flow concurrently or countercurrently to the milk to be cooled. From the first two heating zones 26', the milk passes through the rest of the heating zones 26', in similar manner, in the regeneration section 25'A. At the same time that the cold raw milk is being circulated through the series of heating zones 26', of the regeneration section 25'A, hot, homogenized and pasteurized milk from the homogenizer is passed from line 30' at a temperature of from about 140° F. to about 350° F. into the first two alternative cooling zones of series of cooling zones 27' in the regeneration section 25'A, so as to flow concurrent to the flow of the cold raw milk in the series of heating zones 26'. By means of the common surface walls of the vertical plates 22' which form the heating zones 26' and the cooling zones 27', heat is passed from the hot homogenized and pasteurized milk contained within the series of cooling zones 27', into the cold milk contained within heating zones 26'. In this manner, the hot homogenized and pasteurized milk from the homogenizer is cooled while the cold milk containing the stabilizer from the storage tank 1' is heated. In the regeneration section 25'A the cold milk coming from tank 1' is generally heated to a temperature of from about 50° F. to about 250° F. and the hot homogenized milk flowing from the pasteurizer is cooled to a temperature of from about 80° F. to about 250° F. The unhomogenized milk which is heated in the series of heating zones 26' in the regeneration section 25'A passes from the last zone of the series of cooling zones 26' into the first two alternative zones of the series of heating zones 28', in the heating section 25'B of pasteurizer 20'. In the heating section 25'B hot water or super heated steam at a temperature of from about 150° F. to 400° F. is passed by means of pipe 31' into the first two alternative zones in the series of cooling zones 29', of the heating section 25'B. In this manner, heat is transferred from the hot water or super heated steam contained within the series of cooling zones 29' into the unhomogenized milk contained within the series of heating zones 28'. Due to this transfer of heat from the hot water or super heated steam to the unhomogenized milk, the temperature of the unhomogenized milk in the heating section is brought up to a temperature of from about 140° F. to about 350° F. When the stabilizer is activated, the temperature must be at least 160° F. Heat is transferred from the hot water in the cooling zones 29' to the milk in the heating zones 28' by means of the common surfaces 33' of vertically disposed plates 22' which unite the heating zones 28' and cooling zones 29'. The hot water is removed from the series of cooling zones 29' and from the heating section 25'B by means of a pipe 34' which is connected to last two alternate zones in the series of cooling zones 29'. The heated milk in the zones 28' flows from the heating section 25'B through pipe 35' into homogenizer 44'. Pipe 35' may be provided with a heating coil 43' to regulate and if necessary further raise the temperature of the unhomogenized milk. The milk is then passed from pipe 35' through the holding coils 43' where the milk is held at the pasteurization temperature for a period sufficient to destroy all the toxic bacteria. The flow of the milk into the homogenizer may be regulated by a flow valve 48' which can either slow down, stop or speed up the flow of milk to the homogenizer 44'. The homogenizer may be any conventional homogenizer. Generally, it is preferred to use a homogenizer which operates at a pressure of from about 800 lbs./square inch gauge to about 3,500 lbs./square inch gauge and a temperature of from about 140° F. to 350° F. so as to break up the fat globules within the milk.

In carrying out the process of this invention the temperature of the raw milk coming out of the regeneration section 25'A can be regulated to any temperature of from about 80° F. to about 250° F. depending upon its incoming temperature, the number of cooling and heating zones contained within the regeneration section 25'A and the temperature of the incoming homogenized milk. The temperature of the homogenized milk can also be regulated to any temperature of from about 50° F. to about 250° F. in the regeneration section depending upon the temperature of the incoming raw milk and the number of heating and cooling zones contained within the regeneration section. The temperature of the homogenized milk coming out of the cooling section 25 can be regulated to any temperature of from about 35° F. to 80° F. depending upon the temperature of the cold water coming into the cooling section, and the number of heating and cooling zones in the cooling section. The raw milk leaving the heating section of the pasteurizer may be at any temperature of from 140° F. to 350° F. depending upon the number of heating and cooling zones in the heating section and the temperature of the hot water or superheated steam entering the heating section. Hence in this manner the temperature of the milk within each stage of the process entering the homogenizer and leaving the pasteurizer may be automatically controlled and regulated.

The milk is removed from the homogenizer by means of pipe 30' and passed into the regeneration section 25'A of the pasteurizer in the manner heretofore described. After the homogenized milk leaves the regeneration section of the pasteurizer 20' it flows from the last alternate zones of the series of the cooling zones 36' of the cooling section 25'. The homogenized and pasteurized milk flowing into the cooling zones 36' has lost most of its heat to the cold raw milk which was passed through the series of heating zones 26' of the regeneration section 25'A. In the cooling section the homogenized and pasteurized milk is further cooled by means of cold water which flows from pipe 39' into the first two alternate heating zones 37' of the series of heating zones 37'. Hence in cooling sections 25' of the pasteurizer the heat is transferred from the homogenized and pasteurized milk in the series of cooling zones 36', to the cold water in the series of zones 37' by means of surfaces 38' of the vertically disposed plates 22' which connect the series of coling zones 36' and the series of heating zones 37' in the cooling section 25'. The cold water is removed from the cooling section 25' by means of pipe 42' which is connected to the last two alternate heating zones of the series of heating zones 37'. The homogenized milk is removed from the cooling section 25' of the pasteurizer 20' at a temperature of from 35° to 80° F. through pipe 42' which is connected to the last two alternate zones in the series of cooling zones 36'. In this manner the hot homogenized and pasteurized milk is cooled to a temperature sufficiently low so that the acid may be subsequently added thereto so that a desirable acid reaction can be effected in the stabilized milk so as to produce a fermented product such as sour cream, yoghurt, etc.

By utilizing the high temperature short time pasteurizer shown in FIGURE 5, milk is heated quickly and efficiently to a temperature sufficient to destroy the toxic bacteria and activate the stabilizer and then passed through the homogenizer where the fat globules of the milk are sheared so as to form a milk having uniform consistency. In order to successfully homogenize milk, the temperature of the milk in the homogenizer should be maintained at from about 140° F. to 350° F. and the pressure in the homogenizer maintained at from about 800 lbs./in.$^2$ gauge. By use of the aforedescribed pasteurizer, heat is saved due to the fact that the milk which comes out of the homogenizer is used to heat the milk coming into the pasteurizer and the milk coming into the pasteurizer is used to cool the milk coming out of the homogenizer. It is necessary that the milk coming out of the pasteurizer be cooled before it is pumped by means of pump 42" through line 42' into the acidification tank 46' since high temperatures will tend to produce curdling of the milk when the acidification step is performed. Also, the milk containing stabilizer coming into the pasteurizer is heated to a temperature of from about 160° F. to about 350° F. so that homogenization, pasteurization and the activation of the stabilizer to prevent curdling when acid is subsequently added thereto, occurs. Hence, by utilizing this method of pasteurization and homogenization after the stabilizer is added to and mixed with the milk, a chemically fermented milk product such as sour cream can be produced in a quick and efficient manner without the need of bacterial cultures or lengthly homogenization procedures. Also by utilizing this method of chemical fermentation, one can produce a chemically fermented milk product such as sour cream while simultaneously homogenizing and pasteurizing this product.

In accordance with this invention, pasteurization of the milk may be performed after homogenization has been completed. Hence the raw milk may be heated to a temperature of about 140° F. and then passed into the homogenizer. After homogenization is completed the milk may be passed into the heating section of the pasteurizer and heated to a temperature of from about 160° F. to 350° F. and then passed into the holding tubes 43 to maintain the milk at the pasteurization temperature for a period of time sufficient to destroy all the toxic bacteria.

In carrying out this alternative embodiment, the raw milk is first passed into the regeneration section 25'A of the pasteurizer in heat exchange relationship with hot homogenized and pasteurized milk coming from the holding tubes 43'. After the raw milk is passed through the regeneration section so as to reach a temperature of from about 140° F. to about 250° F., it is passed into the homogenizer 44' where it is homogenized. After the milk is homogenized it is passed into the heating section 25'B of the pasteurizer where it contacts in heat exchange relationship hot water, steam or superheated stem so as to heat the milk to a temperature of from about 180° F. to about 350° F. After the milk leaves the heating section 25'B it enters the regeneration section 25'A by means of first entering a series of holding coils which hold the milk prior to entering section 25'A at a temperature of from 180° F. to 350° F. for a period of time sufficient to destroy all the toxic bacteria in the milk. After entering the regeneration section 25'A, the homogenized and pasteurized milk contact in heat exchange relationship the raw milk so as to preheat the raw milk to a temperature of from about 140° F. to about 250° F. After passing through the regeneration section the pasturized and homogenized milk enters the cooling section 25' where it contacts cold water to heat exchange relationship to cool the pasteurized and homogenized milk to a temperature of from 35° F. to 80° F. After cooling, the homogenized and pasteurized milk is ready to be acidified in the manner of the milk of the preferred embodiment.

Acidification is accomplished by pumping the stabilized milk out of storage tank 46' into line 45' by means of activating pump 47' and opening valve 49'. Valve 52' may then be simultaneously opened to supply acid from funnel 150' either continuously or drop by drop through line 51' and into line 45'. In line 45' the acid supplied from funnel 50' mixes with the milk coming from the tank 46'. Pump 47' then pumps the milk and the acid directly through pipe 60' into any suitable vessel where the acidified milk can be allowed to thicken and reach the desired pH such as pressure vessel 61'. As soon as all of the stabilized milk is acidified and pumped into vessel 61', pump 47, may be stopped and valves 49' and 52' may be closed and a new supply of milk 1 may be added to storage tank 46' through line 42' from the cooling section 25' of the pasteurizer 20' and treated in the same manner.

The above process may be performed automatically and continuously by continually supplying milk through line 42' from the cooling section 25' of the pasteurizer 20' into tank 46' and continuously removing the stabilized milk 2' from the tank 46' by means of pump 47' while continuously supplying acid from funnel 50' to the milk in line 45'. In this manner milk is continually pumped into the pressure vessel 61' by means of pump 47'.

The following five examples illustrate this embodiment; however, they are not to be construed in a limiting sense.

Example X 300 gallons of milk having a butterfat content of 18.5% by weight was pumped into a vessel which is illustrated as 1' in FIGURE 4, said vessel being equipped with an agitator and a recycle system. A stabilizer mixture consisting of 2½ lbs. guar gum, 2½ lbs. dry skim milk solids, 1 lb. of salt (NaCl) was fed into the funnel of the recycle system while the milk was being recycled. The dry stabilized mixture was completely sucked into the milk through the funnel in the recycle system in approximately one to two minutes. The milk and stabilizer mixture was recirculated into and out of the vessel for about 5 minutes with the agitator running so as to thoroughly mix the milk and stabilizer. After this time the milk was passed from the storage tank through a balance tank and into the regeneration section of a high temperature short time pasteurizer. The temperature of the pasteurizer was set at 165° F. From the heating section of the pasteurizer the cream was directed to a two-step homogenizer, the first stage operating at 1000 lbs. per square inch gauge and the second stage operating at 1500 lbs. per square inch gauge. From the homogenizer the cream was directed back to the pasteurizer through the side of the regeneration section and to the cooling section. The cooling water was turned on so that the cream left the pasteurizer at a temperature of 84° F. The cream was then directed to a storage tank by means of a pipe equipped with cooling coils so that the cream entering the storage tank was at a temperature of 70° F. A liquid mixture consisting of 150 fluid ounces of an aqueous solution consisting of 80% by weight lactic acid and 150 fluid ounces of an aqueous solution containing 50% by weight of citric acid were placed in a funnel which was connected to a pipe which leads from the storage tank to a mixing tank. The stabilized milk was passed from the storage tank through this pipe into the mixing tank while the above acid mixture was added to the product flowing through the pipe. The mixing tank was equipped with an agitator and had a conical bottom which sloped at an angle of approximately 20°. During the addition of the acidified milk to the vessel, the agitator was turned on so that thorough mixing of the acid and the milk took place. Approximately three minutes after all the milk was added to vessel, the agitator was stopped and it was observed that the liquid in the vessel thickened to produce a thick viscous sour cream. The sour cream was removed from the vessel by means of creating a pressure within the vessel of approximately 2 lbs. per square inch gauge. The sour cream was removed from the vessel through a nozzle and placed in a small containers and then sealed and cooled to 40° F.

Example XI 10 gallons of milk having a butterfat content of 19% by weight was pumped into a vessel which is illustrated as 1' in FIGURE 4, said vessel being equipped with an agitator and a recycle system. A stabilizer mixture consisting of 3 oz. of guar gum, 12 oz. pre-cooked starch, 1.5 oz. salt (NaCl) was fed into the funnel of the recycle system while the milk was being recycled. The dry stabilized mixture was completely sucked into the milk through the funnel in the recycle system in approximately one to two minutes. The milk and stabilizer mixture was recirculated into and out of the vessel for about 5 minutes with the agitator running so as to thoroughly mix the milk and stabilizer. After this time the milk was passed from the storage tank through a balance tank and into the regeneration section of a high temperature short time pasteurizer. The temperature of the pasteurizer was set at 160° F. From the heating section of the pasteurizer the cream was directed to a two-step homogenizer, the first step operating at 1500 lbs. per square inch gauge and the second stage operating at 1000 lbs. per square inch gauge. From the homogenizer the cream was directed back to the pasteurizer through the side of the regeneration section and to the cooling section. The cooling water was turned on so that the cream left the pasteurizer at a temperature of 85° F. The cream was then directed to a storage tank by means of a pipe equipped with cooling coils so that the cream entering the storage tank was at a temperature of 70° F. A liquid mixture of 5 fluid ounces of an aqueous solution containing 80% by weight of lactic acid and 5 fluid ounces of an aqueous solution containing 50% by weight of citric acid were placed in a funnel which was connected to a pipe which leads from the storage tank to a mixing tank. The stabilized milk was passed from the storage tank through this pipe into the mixing tank while the above acid mixture was added to the product flowing through this pipe. The mixing tank was equipped with an agitator and had a conical bottom which sloped at an angle of approximately 20°. During the addition of the acidified milk to the vessel, the agitator was turned on so that thorough mixing of the acid and milk took place. Approximately three minutes after all the milk was added to the vessel, the agitator was stopped and it was observed that the liquid in the vessel thickened to produce a thick viscous sour cream. The sour cream was removed from the vessel by means of creating a pressure within the vessel of approximately 2 lbs. per square inch gauge. The sour cream was removed from the vessel through a nozzle and placed in small containers and then sealed and cooled to 40° F.

EXAMPLE XII 10 gallons of milk having a butterfat content of 19% by weight was pumped into a vessel which is illustrated as 1' in FIGURE 4, said vessel being equipped with an agitator and a recycle system. A stabilizer mixture consisting of 3.5 oz. guar gum, 20 oz. dry milk solids, 1.5 oz. of salt (NaCl) was fed into the funnel of the recycle system while the milk was being recycled. The dry stabilized mixture was completely sucked into the milk through the funnel in the recycle system in approximately one to two minutes. The milk and stabilizer mixture was recirculated into and out of the vessel for about 5 minutes with the agitator running so as to thoroughly mix the milk and stabilizer. After this time the milk was passed from the storage tank through a balance tank and into the regeneration section of a high temperature short time pasteurizer. The temperature of the pasteurizer was set at 168° F. From the heating section of the pasteurizer the cream was directed to a two-stage homogenizer, the first stage operating at 1500 lbs. per square inch gauge and the second stage operating at 1000 lbs. per square inch gauge. From the homogenizer the cream was directed back to the pasteurizer through the side of the regeneration section and to the cooling section. The cooling water was turned on so that the cream left the pasteurizer at a temperature of 70° F. The cream was then directed to a storage tank by means of a pipe equipped with cooling coils so that the cream entering the storage tank was at a temperature of 70° F. A liquid mixture of 5 fluid ounces of an aqueous solution consisting of 80% by weight of lactic acid and 5 fluid ounces of an aqueous solution consisting of 50% by weight of citric acid were placed in a funnel which was connected to a pipe which lead from the storage tank into the mixing tank. The stabilized milk was passed from the storage tank through this pipe into the mixing tank while the above acid mixture was added to the material flowing through the pipe. The mixing tank was equipped with an agitator and had a conical bottom which sloped at an angle of approximately 20°. During the addition of the acidified milk to the vessel, the agitator was turned on so that thorough mixing of the acid and the milk took place. Approximately three minutes after all the milk was added to the vessel, the agitator was stopped and it was observed that the liquid in the vessel thickened to produce a thick viscous sour cream. The sour cream was removed from the vessel by means of creating a pressure within the vessel of approximately 2 lbs. per square inch gauge. The sour cream was removed from the vessel through a nozzle and placed in small containers and then sealed and cooled to 40° F.

EXAMPLE XIII 10 gallons of milk having a butterfat content of 19% by weight was pumped into a vessel which is illustrated as 1' in FIGURE 4, said vessel being equipped with an agitator and a recycle system. A stabilizer mixture consisting of 3 ounces of guar gum, 17 ounces of dry skim solids, 1.5 ounces of salt (NaCl) was fed into the funnel of the recycle system while the milk was being recycled. The dry stabilized mixture was completely sucked into the milk through the funnel in the recycle system in approximately one to two minutes. The milk and stabilizer mixture was recirculated into and out of the vessel for about 5 minutes with the agitator running so as to thoroughly mix the milk and stabilizer. After this time the milk was passed from the storage tank through a balance tank and into the regeneration section of a high temperature short time pasteurizer. The temperature of the pasteurizer was set at 166° F. From the heating section of the pasteurizer the cream was directed to a two-stage homogenizer, the first stage operating at 1500 lbs. per square inch gauge and the second stage operating at 1000 lbs. per square inch gauge. From the homogenizer the cream was directed back to the pasteurizer through the side of the regeneration section and to the cooling section. The cooling water was turned on so that the cream left the pasteurizer at a temperature of 80° F. The cream was then directed to a storage tank by means of a pipe equipped with cooling coils so that the cream entering the storage tank was at a temperature of 70° F. A liquid mixture of 5 fluid ounces of an aqueous solution consisting of 80% by weight of lactic acid and 5 fluid ounces of an aqueous solution consisting of 50% by weight of citric acid were placed in a funnel which was connected to a pipe which leads from the storage tank to a mixing tank. The stabilized milk was passed from the storage tank through this pipe into the mixing tank while the above acid mixture was added to the product flowing through this pipe. The mixing tank was equipped with an agitator and had a conical bottom which sloped at an angle of approximately 20°. During the addition of the acidified milk to the vessel, the agitator was turned on so that thorough mixing of the acid and the milk took place. Approximately three minutes after all the milk was added to the vessel, the agitator was stopped and it was observed that the liquid in the vessel thickened to produce a thick viscous sour cream. The sour cream was removed from the vessel by means of creating a pressure within the vessel of approximately 2 lbs. per square inch gauge. The sour cream was removed from the vessel through a nozzle and placed in small containers and then sealed and cooled to 40° F.

Example XIV 10 gallons of milk having a butterfat content of 19% by weight was pumped into a vessel which is illustrated as 1' in FIGURE 4, said vessel being equipped with an agitator and a recycle system. A stabilizer mixture consisting of 4 oz. of guar gum, 4 oz. of dry skim solids, 1.5 oz. of salt (NaCl) was fed into the funnel of the recycle system while the milk was being recycled. The dry stabilized mixture was completely sucked into the milk through the funnel in the recycle system in approximately one to two minutes. The milk and stabilizer mixture was recirculated into and out of the vessel for about 5 minutes with the agitator running so as to thoroughly mix the milk and stabilizer. After this time the milk was passed from the storage tank through a balance tank and into the regeneration section of a high temperature short time pasteurizer. The temperature of the pasteurizer was set at 165° F. From the heating section of the pasteurizer the cream was directed to a two-stage homogenizer, the first stage operating at 1500 lbs. per square inch gauge and the second stage operating at 1000 lbs. per square inch gauge. From the homogenizer the cream was directed back to the pasteurizer through the side of the regeneration section and to the cooling section. The cooling water was turned on so that the cream left the pasteurizer at a temperature of 84° F. The cream was then directed to a storage tank by means of a pipe equipped with cooling coils so that the cream entering the storage tank was at a temperature of 70° F. A liquid mixture of 5 fluid ounces of an aqueous solution consisting of 50% by weight of lactic acid and 5 fluid ounces of an aqueous solution consisting of 50% by weight of citric acid were placed in a funnel which was connected to a pipe which leads from the storage tank to a mixing tank. The stabilized milk was passed from the storage tank through this pipe into the mixing tank while the above acid mixture was added to the milk flowing through the pipe. The mixing tank was equipped with an agitator and had a conical bottom which sloped at an angle of approximately 20°. During the addition of the acidified milk to the vessel, the agitator was turned on so that thorough mixing of the acid and the milk took place. Approximately three minutes after all of the milk was added to the vessel the agitator was stopped and it was observed that the liquid in the vessel thickened to produce a thick viscous sour cream. The sour cream was removed from the vessel by means of creating a pressure within the vessel of approximately 2 lbs. per square inch gauge. The sour cream was removed from the vessel through a nozzle and placed in small containers and then sealed and cooled to 40° F.

Thus, by the present discovery, outstanding dairy products such as sour cream, buttermilk, yoghurt, sour cream dressings, dips and spreads, etc. have been provided for which are characterized by a long shelf life, i.e., enhanced stability as to body and flavor and having only a minimal, i.e., a low bacteria count when compared with those products produced by fermentation procedures. That is, the bacteria count of the products of this invention is of the order of about 3,000 bacteria per gram of product.

Having described my invention what I claim is new and desire to secure by Letters Patent is:

1. A process of preparing chemically acidified milk products wherein separation of the milk product into the curd and whey is substantially eliminated, comprising the steps of
   (A) providing milk having a butterfat content of from about 0.05% to about 45% by weight,
   (B) intimately introducing in an amount of at least 0.01% by weight of said milk, an edible organic colloidal stabilizer into said milk,
   (C) heating the milk containing said stabilizer to a temperature of about 160° F. to about 225° F.,
   (D) cooling said stabilized milk to a temperature of about 35° F. to 80° F., and
   (E) adding to said cooled milk at least one compound selected from the group consisting of edible non-toxic acids and acidogens which are capable of forming an edible non-toxic acid upon slow hydrolysis without substantially diluting the butterfat content of said milk, said compound being added in sufficient quantity to produce a chemically acidified product having a pH within the range of from about 3.5 to about 6, with the proviso that when sour cream is prepared, said milk is homogenized at any time prior to adding said compound.

2. The process of claim 1 wherein said stabilizer comprises a mixture of locust bean gum and gum tragacanth.

3. The process of claim 1 wherein said compound is lactic acid.

4. The process of claim 1, wherein said stabilizer is introduced into said milk at a temperature between about 34° F. to about 80° F.

5. The process of claim 1 wherein said stabilizer comprises a mixture of tapioca starch, tapioca flour and gum tragacanth.

6. The process of claim 1 wherein said compound is a mixture of lactic and citric acid.

7. The process of claim 1 wherein said milk has a butterfat content of from about 7% to about 25% by weight and including the step of homogenizing said milk at any time prior to introducing said compound.

8. The process of claim 1 wherein said compound is added in an amout so as not to lower the butterfat content of the milk more than 3% by weight based upon the weight of the original weight of the butterfat content of said milk.

9. A method of producing sour cream comprising the following steps:
   (A) charging a vat with milk having a butterfat content of from 7% to 25% by weight,
   (B) intimately introducing an edible organic colloidal stabilizer into said milk in an amount of at least 0.01% by weight of said milk,
   (C) heating the milk containing said stabilizer to a temperature of about 160° F. to about 225° F.,
   (D) cooling said stabilized milk to a temperature of about 35° F. to 80° F.,
   (E) adding to said cooled milk, without substantially diluting the butterfat content of said milk at least one compound selected from the group consisting of edible non-toxic acids and acidogens capable of forming an edible non-toxic acid upon slow hydrolysis, said compound being added in sufficient quantity to produce sour cream having a pH of from about 3.5 to 6, with the proviso that said milk is homogenized at any time prior to the addition of said compound,
   (F) passing the mixture of said milk and compound into a zone of superatmospheric pressure,
   (G) agitating said mixture in said pressure zone whereupon said mixture in said zone forms a thick viscous sour cream product,
   (H) positioning said sour cream product at the bottom portion of said zone in a metastable state, and
   (I) raising the pressure in said zone to at least 1 pound per square inch gauge while said sour cream is thickening in said zone, and
   (J) discharging said sour cream out of said zone by means of said pressure and said metastable positioning.

10. A method of producing chemically acidified dairy products which comprises the following steps:
(A) intimately introducing into raw milk having a butterfat content from about 0.05% to about 45% by weight, and edible organic colloidal stabilizer in an amount of at least 0.01% by weight of said milk.
(B) heating the milk containing said stabilizer to a temperature of from about 160° F. to about 350° F. to simultaneously pasteurize said milk and activate said stabilizer.
(C) homogenizing said milk at a temperature of from about 140° F. to 350° under a pressure of from about 800 lbs. per square inch gauge to about 3,500 lbs. per square inch gauge,
(D) cooling said milk to a temperature of about 35° F. to about 80° F.
(E) adding a compound selected from the group consisting of edible non-toxic acids and acidogens which are capable of forming non-toxic edible acids upon slow hydrolysis to said stabilized milk in an amount sufficient to produce a chemically acidified product having a pH of from about 3.5 to about 6,
(F) maintaining said milk at substantially the same butterfat content of said raw milk during the addition of said compound, and
(G) agitating said compound and said milk so as to form a uniform, homogeneous, viscous milk product having a pH of from about 3.5 to 6, said homogenization step being carried out at any time prior to adding said compound.

11. The process of claim 10 wherein said raw milk has a butterfat content of from about 7% to about 25% by weight.

12. A method of producing chemically acidified dairy products which comprises the following steps:
(A) intimately introducing into raw milk having a butterfat content ranging from about 0.05% to about 45% by weight, an edible organic colloidal stabilizer in an amount of at least 0.01% by weight of said milk.
(B) passing said raw milk into heat exchange relationship with a second supply of homogenized and pasteurized milk which is at a temperature of from 140° F. to 350° C., to heat said raw milk to a temperature of from about 80° F. to 250° F.,
(C) passing the raw milk containing said stabilizer at a temperature of from 80° F. to 250° F. through a heating medium to heat said raw milk to a temperature of from about 160° F. to about 350° F. thereby simultaneously pasteurizing said raw milk and activating said stabilizer contained within said raw milk,
(D) homogenizing said raw milk at a temperature of from about 140° F. to 350° F. under a pressure of from about 800 lbs./sq. in. gauge to about 3,500 lbs./sq. in. gauge,
(E) cooling said homogenized milk to a temperature of about 35° F. to about 80° F.
(F) adding a compound selected from the group consisting of edible non-toxic acids and acidogens which are capable of forming edible non-toxic acids upon slow hydrolysis to said stabilized homogenized milk in an amount sufficient to produce a chemically acidified product having a pH of from about 3.5 to about 6,
(G) maintaining said homogenized milk at substantially the same butterfat content of said raw milk during the adidtion of said compound, and
(H) agitating said compound and said milk so as to form a uniform homogeneous milk product having a pH of from about 3.5 t o 6.

13. A method of producing chemically acidified dairy products which comprises the following steps:
(A) intimately introducing into raw milk having a butterfat content ranging from about 0.05% to about 45% by weight, an edible organic colloidal stabilizer in an amount of at least 0.01% by weight of said milk,
(B) heating the milk containing said stabilizer to a temperature of from about 160° F. to about 350° F. to simultaneously pasteurize said milk and activate said stabilizer,
(C) homogenizing said milk at a temperature of from about 140° F. to 350° F. under a pressure of from about 800 lbs./square inch gauge to about 3,500 lbs./square inch gauge,
(D) cooling said milk to a temperature of about 35° F. to about 80° F.,
(E) adding a compound selected from the group consisting of edible non-toxic acids and acidogens which are capable of forming non-toxic edible acids upon slow hydrolysis into said stabilized milk in an amount sufficient to produce a chemically acidified product having a pH of from about 3.5 to about 6,
(F) maintaining said milk at substantially the same butterfat content of said raw milk during the addition of said compound,
(G) passing said milk and acid mixture into a zone of superatmospheric presure,
(H) agitating said mixture in said pressure zone whereupon said mixture forms a uniform homogeneous viscous milk product,
(I) positioning said milk product in a metastable state at the bottom portion of said zone and
(J) raising the pressure in said zone to at least 1 pound per square inch gauge and discharging said product out of said zone by means of said pressure and said metastable positioning.

14. The process of 13 wherein said raw milk has a butterfat content of from about 7% to about 25% by weight.

References Cited
UNITED STATES PATENTS

| | | | |
|---|---|---|---|
| 1,661,601 | 3/1928 | Dahlberg | 99—116 |
| 1,815,727 | 7/1931 | Reynolds | 99—59 X |
| 2,055,782 | 9/1936 | Baier | 99—206 |
| 2,253,614 | 8/1941 | Epstein et al. | 99—54 X |
| 2,719,793 | 10/1955 | Page et al. | 99—59 |
| 2,832,687 | 4/1958 | Lane et al. | 99—59 |
| 2,853,386 | 9/1958 | Hughes | 99—54 |
| 2,956,885 | 10/1960 | Roundy et al. | 99—116 |
| 2,982,654 | 5/1961 | Hammond et al. | 99—116 |
| 3,370,955 | 2/1968 | Little | 99—59 |
| 3,378,375 | 4/1968 | Little | 99—59 |

FOREIGN PATENTS
677,531 8/1952 Great Britain.

LIONEL M. SHAPIRO, *Primary Examiner.*